Patented May 20, 1924.

1,494,434

UNITED STATES PATENT OFFICE.

JACOB G. LIPMAN, OF NEW BRUNSWICK, NEW JERSEY.

SULPHUR-OXIDIZING ORGANISM AND METHOD OF PRODUCING THE SAME.

No Drawing. Application filed January 20, 1920, Serial No. 352,861. Renewed October 4, 1923.

*To all whom it may concern:*

Be it known that I, JACOB G. LIPMAN, a citizen of the United States, residing at New Brunswick, in the county of Middlesex and State of New Jersey, have invented certain new and useful Improvements in Sulphur-Oxidizing Organisms and Methods of Producing the Same, of which the following is a full, clear, and exact description.

This invention relates to sulphur-oxidizing organisms and methods of producing or isolating the same. More specifically the invention relates to organisms capable of oxidizing elementary sulphur to sulfuric acid. The sulfuric acid so produced may be utilized for various purposes, some of which will be hereinafter specified.

One method of isolating the sulphur-oxidizing bacteria, which has been found satisfactory, is substantially as follows: Sulphur is added to fertile soil and the material is kept moist and stirred from time to time for a period of ten weeks or more. A small quantity of the material in question is then added to a suitable culture medium and the bacteria allowed to develop. The culture is then purified by any suitable method, such as the plate method commonly employed in bacteriological laboratories.

The culture media which I find best at this time for the growth of the sulphur-oxidizing organisms are those containing elementary sulphur. A very satisfactory culture medium may be prepared as follows: An agent capable of metabolizing the organisms, i. e. mineral salts for the metabolism of the organisms a carbohydrate and a suitable source of nitrogen are dissolved in distilled water. If desirable, calcium carbonate or tricalcic phosphate may be added. The medium is then sterilized in the usual manner. Elementary powdered flour of sulphur is then sterilized in a suitable manner as by placing it in sterilized closed containers and sterilizing it at a temperature of 65 to 70 degrees centigrade for about 24 hours. The sulphur so sterilized is added to the sterile culture medium previously described resulting in the complete medium for the growth of the sulphur-oxidizing organisms. It may be stated that without attempting to define all of the substances available the metabolizing agent, referred to above, may consist of minerals such as those containing magesium, phosphorus, iron and potassium in the proper amounts. Dextrose or sucrose may be employed as the carbohydrate and sodium nitrate or nitrite as the source of nitrogen. The substances specifically set forth above may be employed in the following proportions:

| | |
|---|---|
| Magnesium chloride | .01 to .1%. |
| Dipotassium phosphate | .05 to .5%. |
| Ferric chloride | One or two drops of a 10% solution per liter of culture medium. |
| Dextrose | .5 to 1.5%. |
| Sodium nitrate | .1 to 1.0%. |
| Elementary sulphur | 1.0%. |

The materials and proportions thereof may be varied. For example, where tricalcic phosphate is added no dipotassium phosphate is needed and potassium nitrate may be employed instead of sodium nitrate. When calcium carbonate or tricalcic phosphate is added the amounts vary from .1 to .5%.

The sulphur-oxidizing organism, produced or isolated as above described, is a bacterium, usually occurring in short cylindrical cells with rounded ends. The cylinders are so short as to be almost spherical and occur abundantly in a diplococcus-like form and also in chains. The cells have a hyaline center and an opaque outer zone. There is a granular substance at the outer zone. The cells are gram positive. The growth on Krainsky's asparagin glucose agar, when 48 hours old, consists of white colonies with a grayish tinge, a smooth surface somewhat raised but not spreading. This organism has the ability, when growing in pure culture and in a suitable medium, to oxidize elementary sulphur to sulfuric acid which may be employed for a variety of purposes. Thus the sulfuric acid so produced may be concentrated and used for various technical purposes. It may be used to treat phosphate rock to produce soluble phosphates. By treating greensand marl and other potash-bearing minerals with it soluble potash fertilizers may be produced. Black alkali may be converted to white alkali by means of its use, and so-called alkali soils thereby reclaimed. It may be used for supplying sulphates to crops in regions where the natural soil supply is inadequate. It may also be used to check the development of scab on potato tubers or for destroying noxious vegetation, insects or organisms.

In addition to the bacterium, specifically described above, I have isolated two other bacteria and one microorganism, belonging to the groups of molds, capable of oxidizing elementary sulphur to sulfuric acid.

What I claim is:

1. A method of cultivating sulphur-oxidizing bacteria which comprises producing a sterile culture medium containing alkaline earth metal compounds, alkali metal compounds, carbohydrates, sulphur, fertile soil, soluble iron compounds and water, inoculating said medium with a culture containing sulphur-oxidizing bacteria and allowing the same to grow.

2. A method of cultivating sulphur-oxidizing bacteria which comprises producing a sterile culture medium containing alkaline earth metal compounds, alkali metal compounds, carbohydrates, sulphur, fertile soil, soluble iron compounds and water, inoculating said medium with a culture containing sulphur-oxidizing bacteria and allowing the same to grow, and thereafter purifying the culture.

3. A culture medium for sulphur-oxidizing bacteria, which medium comprises a metabolizing agent, a carbohydrate, a soluble iron compound, a source of nitrogen, and sulphur.

4. A culture medium for sulphur-oxidizing bacteria, which medium comprises metabolizing minerals, a carbohydrate, a soluble iron salt, a compound containing nitrogen, and sulphur.

5. A culture medium for sulphur-oxidizing bacteria, which medium comprises a phosphate, a carbohydrate, a nitrogen compound, a soluble iron compound, and sulphur.

6. A culture medium for sulphur-oxidizing bacteria, which medium comprises a magnesium salt, an iron salt, a phosphate, a carbohydrate, a nitrogen compound, and sulphur.

7. The method of preparing a culture medium for sulphur-oxidizing bacteria, which method comprises forming a mixture containing a metabolizing mineral, a carbohydrate, a soluble iron salt, and a nitrogen compound, sterilizing the mixture, and adding sterilized sulphur.

8. The method of preparing a culture medium for sulphur-oxidizing bacteria, which method comprises forming a solution containing metabolizing minerals, a carbohydrate, an iron salt, and a nitrogen compound, sterilizing the solution, and adding sterilized sulphur.

9. The method of preparing a culture medium for sulphur-oxidizing bacteria, which method comprises mixing magnesium chloride, dipotassium phosphate, ferric chloride, dextrose, sodium nitrate and elementary sulphur in the following proportions:

| | |
|---|---|
| Magnesium chloride | .01 to .1%. |
| Dipotassium phosphate | .05 to .5%. |
| Ferric chloride | One or two drops of a 10% solution per liter of culture medium. |
| Dextrose | .5 to 1.5%. |
| Sodium nitrate | .1 to 1.0%. |
| Elementary sulphur | 1.0%. |

10. The method of producing sulphur-oxidizing bacteria which comprises mixing sulphur with fertile soil, and adding the mixture to a culture medium having the composition specified in claim 4.

11. The method of producing sulphur-oxidizing bacteria which comprises mixing sulphur with fertile soil, and adding the mixture to a culture medium having the composition specified in claim 5.

12. The method of producing sulphur-oxidizing bacteria which comprises mixing sulphur with fertile soil, and adding the mixture to a culture medium having the composition specified in claim 6.

13. The method of producing sulphur-oxidizing bacteria which comprises mixing sulphur with fertile soil, and adding the mixture to a culture medium having the composition specified in claim 3.

In testimony whereof I hereunto affix my signature.

JACOB G. LIPMAN.